(12) United States Patent
Izawa

(10) Patent No.: US 6,741,294 B2
(45) Date of Patent: May 25, 2004

(54) DIGITAL SIGNAL PROCESSOR AND DIGITAL SIGNAL PROCESSING METHOD

(75) Inventor: Takashi Izawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/367,125

(22) PCT Filed: Dec. 8, 1998

(86) PCT No.: PCT/JP98/05542

§ 371 (c)(1),
(2), (4) Date: Aug. 6, 1999

(87) PCT Pub. No.: WO99/30276

PCT Pub. Date: Jun. 17, 1999

(65) Prior Publication Data

US 2003/0174250 A1 Sep. 18, 2003

(30) Foreign Application Priority Data

Dec. 8, 1997 (JP) .............................. 9-336717

(51) Int. Cl.⁷ .......................... H04N 7/01; H04N 11/20
(52) U.S. Cl. ...................... 348/581; 348/580; 348/561; 348/567; 348/715; 348/704; 382/298; 345/505; 712/22
(58) Field of Search ................................ 348/581, 580, 348/561, 567, 568, 704, 448, 715, 714; 382/234, 235, 298, 299; 345/505, 506, 536, 547; 711/5, 117, 120; 712/11, 22

(56) References Cited

U.S. PATENT DOCUMENTS 4,763,270 A * 8/1988 Itoh et al. .................... 340/988
5,144,437 A * 9/1992 Miyauchi .................... 348/565
5,237,396 A * 8/1993 Kayashima et al. ........ 348/448
5,450,553 A * 9/1995 Kitagaki et al. ............ 711/214
5,712,689 A * 1/1998 Yasuki et al. ............... 348/561
5,742,353 A * 4/1998 Yasuki et al. ............... 348/452
6,069,662 A * 5/2000 Horiuchi et al. ............ 348/446
6,151,425 A * 11/2000 Wakisawa et al. .......... 348/561
6,392,711 B1 * 5/2002 Kesatoshi ................... 348/581

* cited by examiner

Primary Examiner—Michael H. Lee
Assistant Examiner—Jean W. Désir
(74) Attorney, Agent, or Firm—Frommer Lawrence & Haug LLP; William S. Frommer; Hans R. Mahr

(57) ABSTRACT

A digital signal processing apparatus for parallel executing a plurality of data processes with a single common command is disclosed, that comprises a plurality of input storing means, each of which is composed of a plurality of storing elements, an input controlling means for controlling the input storing means, a calculating means, having a plurality of element calculating means corresponding to the plurality of the storing elements of the input storing means, for parallel calculating data stored in each storing element of the input storing means, a data storing means, having a plurality of storing elements corresponding to the plurality of element calculating means of the calculating means, for storing calculated result data of the element calculating means corresponding to the storing elements, a plurality of output storing means, each of which is composed of a plurality of storing elements corresponding to the plurality of element calculating means of the calculating means, for storing the calculated result data, an output controlling means for controlling the output storing means, and a controlling means for controlling the input storing means, the calculating means, the data storing means, and the output storing means corresponding to a control program.

7 Claims, 18 Drawing Sheets

EXAMPLE OF SIMD PICTURE PROCESSOR AND PICTURE PROCESSING APPARATUS

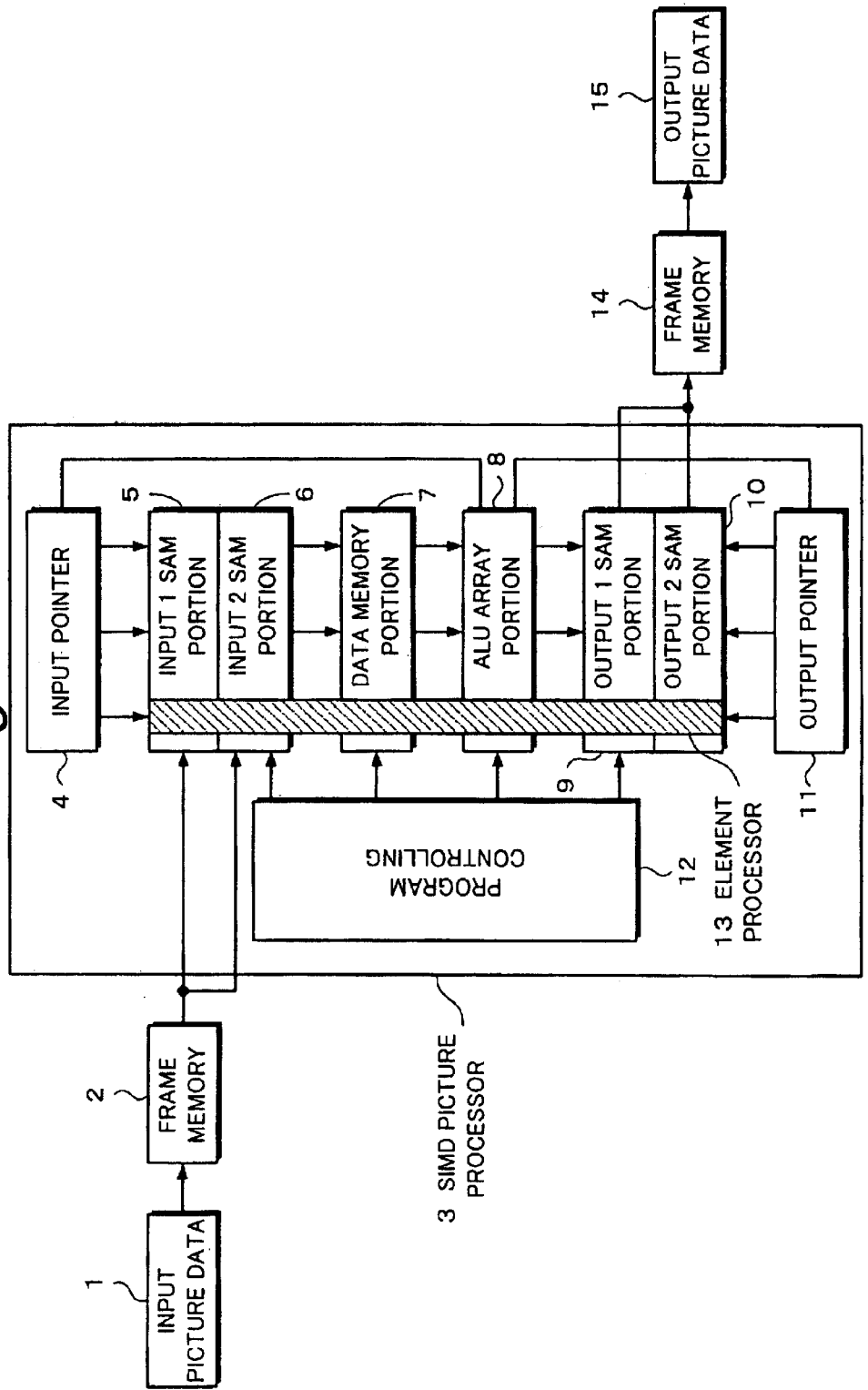

normal mode skip mode

STRUCTURE OF INPUT/OUTPUT POINTERS

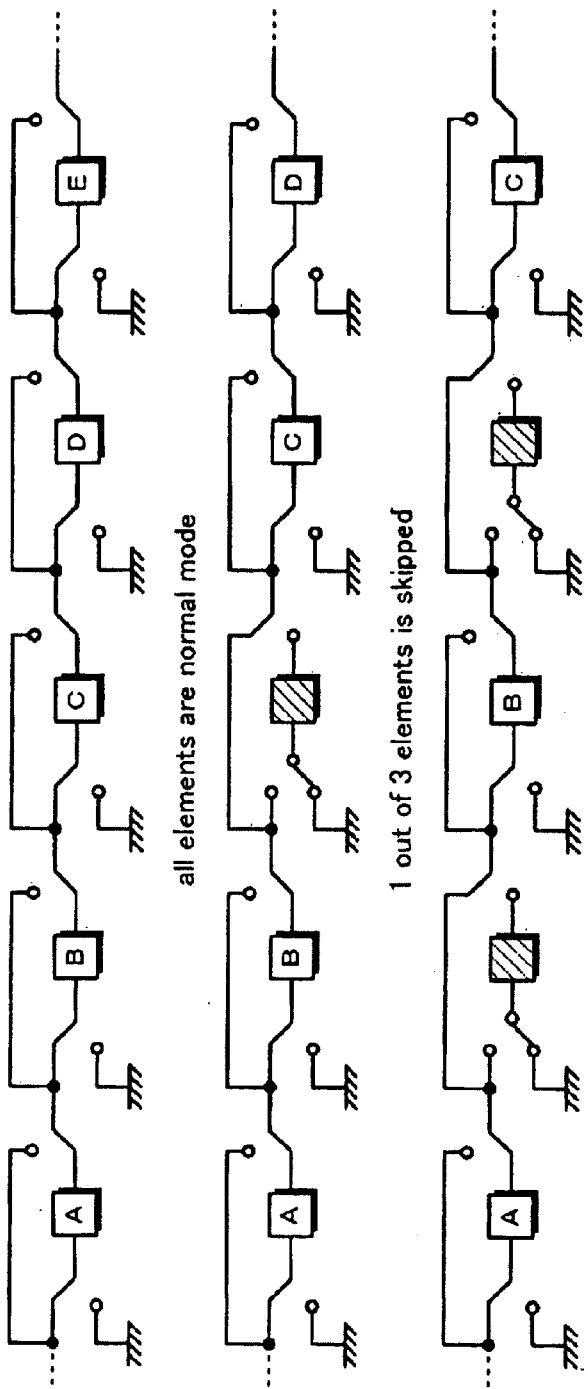

INPUT POINTER SETTING ALGORITHM FOR ENLARGING PROCESS IN TWO-INPUT-PHASE AND TWO-OUTPUT-PHASE STRUCTURE (NO. 1)

INPUT POINTER SETTING ALGORITHM FOR ENLARGING PROCESS IN TWO-INPUT-PHASE AND TWO-OUTPUT-PHASE STRUCTURE (NO. 2)

INPUT POINTER SETTING ALGORITHM FOR ENLARGING PROCESS IN TWO-INPUT-PHASE AND TWO-OUTPUT-PHASE STRUCTURE (NO. 3)

OUTPUT POINTER SETTING ALGORITHM FOR REDUCING PROCESS IN TWO-INPUT-PHASE AND TWO-OUTPUT-PHASE STRUCTURE (NO. 1)

OUTPUT POINTER SETTING ALGORITHM FOR REDUCING PROCESS IN TWO-INPUT-PHASE AND TWO-OUTPUT-PHASE STRUCTURE (NO. 2)

OUTPUT POINTER SETTING ALGORITHM FOR REDUCING PROCESS IN
TWO-INPUT-PHASE AND TWO-OUTPUT-PHASE STRUCTURE (NO. 3)

ADJACENT PIXEL (FOUR-PIXEL) EXTRACTING ALGORITHM FOR ENLARGING PROCESS IN TWO-INPUT-PHASE AND TWO-OUTPUT-PHASE STRUCTURE (NO. 1)

ADJACENT PIXEL (FOUR-PIXEL) EXTRACTING ALGORITHM FOR ENLARGING PROCESS IN TWO-INPUT-PHASE AND TWO-OUTPUT-PHASE STRUCTURE (NO. 2)

ADJACENT PIXEL (FOUR-PIXEL) EXTRACTING ALGORITHM FOR ENLARGING
PROCESS IN TWO-INPUT-PHASE AND TWO-OUTPUT-PHASE STRUCTURE (NO. 3)

ADJACENT PIXEL (FOUR PIXEL) EXTRACTING ALGORITHM FOR REDUCING
PROCESS IN TWO-INPUT-PHASE AND TWO-OUTPUT-PHASE STRUCTURE (NO. 2)

ADJACENT PIXEL (FOUR PIXEL) EXTRACTING ALGORITHM FOR REDUCING PROCESS IN TWO-INPUT-PHASE AND TWO-OUTPUT-PHASE STRUCTURE (NO. 2)

| NUMBER OF TIMES OF LOOP REPEATED | PE0 | PE1 | PE2 | PE3 | PE4 | PE5 | PE6 | PE7 | PE8 | PE9 | PE10 | PE11 | PE12 | PE13 | PE14 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 1 | 384 | 384 | 384 | 384 | 384 | 384 | 384 | 384 | 384 | 384 | 384 | 384 | 384 | 384 | 384 |
| 2 | 384 | 256 | 256 | 256 | 256 | 256 | 256 | 256 | 256 | 256 | 256 | 256 | 256 | 256 | 256 |
| 3 | | | 128 | 128 | 128 | 128 | 128 | 128 | 128 | 128 | 128 | 128 | 128 | 128 | 128 |
| ⋮ | 384 | 256 | 128 | 0 | 384 | 256 | 128 | 0 | 384 | 256 | 128 | 0 | 384 | 256 | 128 |
| n | | | | | | | | | | | | | | | |

| TRANSITION STATE OF phase1 | PE0 | PE1 | PE2 | PE3 | PE4 | PE5 | PE6 | PE7 | PE8 | PE9 | PE10 | PE11 | PE12 | PE13 | PE14 |
|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 2 | 1 | 1 | 0 | 0 | 0 | 0 | 0 | 0 | 0 | 0 | 0 | 0 | 0 | 0 | 0 |
| ⋮ n | | | | | | | | | | | | | | | |

| TRANSITION STATE OF flag1 | PE0 | PE1 | PE2 | PE3 | PE4 | PE5 | PE6 | PE7 | PE8 | PE9 | PE10 | PE11 | PE12 | PE13 | PE14 |
|---|---|---|---|---|---|---|---|---|---|---|---|---|---|---|---|
| 0,1,2,⋯n | 1 | 1 | 0 | 0 | 1 | 1 | 0 | 0 | 1 | 1 | 0 | 0 | 1 | 1 | 0 |

Fig. 17

| | PE0 | PE1 | PE2 | PE3 | PE4 | PE5 | PE6 | PE7 | PE8 | PE9 | PE10 | PE11 | PE12 | PE13 | PE14 |
|---|---|---|---|---|---|---|---|---|---|---|---|---|---|---|---|
| INPUT DATA | 1 2 | 3 4 | x x | 5 6 | 7 8 | x x | 9 10 | 11 12 | x x | 13 14 | 15 16 | x x | 17 18 | 19 20 | x x |
| INPUT POINTER flag1 | 0 0 | 0 1 | 1 1 | 0 0 | 0 0 | 1 1 | 0 1 | 0 0 | 1 0 | 0 1 | 0 1 | 1 0 | 0 0 | 0 1 | 1 1 |
| OUTPUT DATA | 1' 2' | 3' 4' | 5' 6' | 7' 8' | 9' 10' | 11' 12' | 13' 14' | 15' 16' | 17' 18' | 19' 20' | 21' 22' | 23' 24' | 25' 26' | 27' 28' | 29' 30' |

EXAMPLE OF CONVENTIONAL SIMD PICTURE PROCESSOR AND PICTURE PROCESSING APPARATUS

DIGITAL SIGNAL PROCESSOR AND DIGITAL SIGNAL PROCESSING METHOD

TECHNICAL FIELD

The present invention relates to a digital signal processing apparatus and a digital signal processing method applicable to a picture processing apparatus for performing a picture enlarging process and a picture reducing process.

BACKGROUND ART

In the field of a conventional picture signal process, the same calculation is performed for all pixels of one picture. To perform the same calculation for many pieces of data at high speed, SIMD (Single Instruction Multiple Data Stream) architecture has been proposed. Thus, the SIMD architecture has been used in various fields as well as the field of the picture signal process. In the SIMD architecture, a required number of calculating devices are disposed and operated corresponding to the same instruction. Thus, when different data is input to individual calculating devices, they output respective results corresponding to the input data.

An SIMD processing device applied for a picture process has been disclosed by for example Kurokawa et al. in "5. 4 GOPS Linear Array Architecture DSP for Video Format Conversion n", IEEE February/1996 ISSCC, FP15. 7. The device is a parallel processor as shown in FIG. 18.

The device shown in FIG. 18 is composed of an input picture data 1, an input frame memory 2, SIMD picture processors (parallel processors) 3a and 3b, an output frame memory 14, and an output picture data 15. Each of the parallel processors 3a and 3b is composed of an input pointer 4, an input SAM (Serial Access Memory) portion 5, a data memory portion 7, an ALU array portion 8, an output SAM portion 9, an output pointer 11, a program controlling portion 12, and so forth.

The input SAM portion 5, the data memory portion 7, the ALU array portion 8, and the output SAM portion 9 compose a linear array element processor group. The many element processors are controlled (SIMD-controlled) by the common program controlling portion 12 as a program control function. The program controlling portion 12 contains a program memory and a sequence controlling circuit that controls a program stored in the memory. The program controlling portion 12 generates various control signals for individual portions corresponding to the program stored in the program memory.

The program controlling portion 12, the data memory portion 7, and the ALU array portion 8 compose a processor block. When processor blocks are disposed in many stages, the process performance improves corresponding to the number of stages. In FIG. 18, each processor block is an SIMD processing device. However, the entire apparatus composed of individual processor blocks is an MIMD (Multiple Instruction Multiple Data Stream) processing device that can process a plurality of programs in parallel.

A conventional processor processes data word by word. However, in one element processor represented by a rectangular area (hatched area) of FIG. 18, the input SAM portion 5, the data memory portion 7, and the output SAM portion 9 correspond to a "column" of a memory. In addition, the ALU array portion 8 is a one-bit ALU. Thus, actually, the element processor is a circuit based on a full-adder. Thus, the element processor is a bit-processor unlike with a conventional processor. The element processor is a one-bit machine in the sense of a CPU as in an eight-bit machine or a 16-bit machine. Since the hardware scale of a bit-processor is small and many parallel processes that are not conventionally available can be accomplished, the number of element processors linearly arrayed matches the number of pixels (H) in one horizontal period of a picture signal.

The processor 3a shown in FIG. 18 performs a picture process in the following manner. In a horizontal scanning active period, input data for one horizontal scanning line is stored to the input SAM portion 5. In a horizontal scanning blanking period, data is transferred from the input SAM portion 5 to the data memory portion 7. The data memory portion 7 and the ALU array portion 8 perform calculating processes corresponding to the program. After the calculating processes have been completed, the processed results of the data memory portion 7 and the ALU array portion 8 are transferred to the output SAM portion 9. In the horizontal scanning active period, the data for one horizontal scanning line is output from the output SAM portion 9. In the above-described processes, each portion operates in parallel.

When the processor 3a performs a picture process, the size of a picture depends on the number of element processors of the processor 3a. When a picture whose size exceeds the number of element processors, as shown in FIG. 18, two or more processors that are the same processors such as processors 3a and 3b are disposed and data that is input to the input SAM portion 5 of each processor is controlled through the frame memory 2. Thus, a complicated hardware structure is required.

When a processor performs a picture process (in particular, a pixel number converting process), the sizes of input/output pictures should be considered. When the sizes of the input/output pictures are smaller than the number of element processors, one processor is used. In contrast, when the sizes of the input/output pictures are larger than the number of element processors, a plurality of processors are used.

In recent years, a picture process with a resolution (namely, the number of pixels is larger than the number of element processors) has been required. In FIG. 18, to accomplish such a picture process, two processors 3a and 3b are used. However, since a plurality of processors are used, the hardware becomes complicated and large. In addition, the cost of the apparatus becomes high. Moreover, when a pixel number converting process is performed, a circuit that connects a plurality of processors is important. However, this circuit becomes complicated.

Therefore, an object of the present invention is to provide a digital signal processing apparatus and a digital signal processing method for use with a picture processing apparatus that allows such a problem to be solved and a simple and inexpensive processor to be used.

DISCLOSURE OF THE INVENTION

The present invention is a digital signal processing apparatus for parallel executing a plurality of data processes with a single common command, comprising a plurality of input storing means, each of which is composed of a plurality of storing elements, an input controlling means for controlling the input storing means, a calculating means, having a plurality of element calculating means corresponding to the plurality of the storing elements of the input storing means, for parallel calculating data stored in each storing element of the input storing means, a data storing means, having a plurality of storing elements corresponding to the plurality of element calculating means of the calculating means, for storing calculated result data of the element calculating means corresponding to the storing elements, a plurality of output storing means, each of which is composed of a plurality of storing elements corresponding to the plurality of element calculating means of the calculating means, for storing the calculated result data, an output controlling means for controlling the output storing means, and a controlling means for controlling the input storing means, the calculating means, the data storing means, and the output storing means corresponding to a control program.

The present invention is a digital signal processing method, comprising the steps of (a) separating a sequence of data into at least two sets, (b) parallel calculating each separated data in common, (c) storing the calculated results, and (d) selecting and outputting the stored data corresponding to each separated data.

According to the apparatus and method of the present invention, with one parallel processor, a picture processing apparatus that can process a picture whose size is twice as large as the number of element processors. Thus, since the picture processor apparatus can be composed of a small number of parallel processors, the structure of the entire picture processing apparatus including peripheral circuits becomes simple.

In addition, since the data memory portion and the ALU array portion are shared, in comparison with the structure using a plurality of parallel processors, the area of the parallel processor becomes narrow. In addition, it is not necessary to connect processors. Thus, the apparatus can be structured in a small circuit scale. Moreover, since the number of parts of the circuit is small, the cost of the apparatus can be reduced.

BRIEF DESCRIPTION OF DRAWINGS

FIG. 1 is a block diagram showing the structure of a picture processing apparatus having an SIMD picture processor according to an embodiment of the present invention;

FIG. 3 is a schematic diagram showing the relation between an input/output SAM portion and an input/output pointer;

FIG. 15 is a schematic diagram showing an example of input data and output data for explaining an embodiment of the present invention;

FIG. 16 is a schematic diagram for explaining an embodiment of the present invention;

FIG. 17 is a schematic diagram for explaining an embodiment of the present invention.

BEST MODE FOR CARRYING OUT THE INVENTION

Figure 2A:
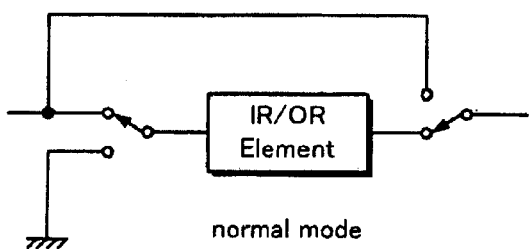
FIG. 2 is a circuit diagram showing the structure of an input/output pointer.

Next, with reference to the accompanying drawings, a picture process of a digital signal processing apparatus and a digital signal processing method according to an embodiment of the present invention will be described. FIG. 1 shows a picture processing apparatus having a parallel picture processor according to an embodiment of the present invention.

The picture processing apparatus shown in FIG. 1 is composed of input picture data 1, input frame memory 2, an SIMD picture processor 3, an output frame memory 14, and output picture data 15. The SIMD picture processor (parallel processor) 3 is composed of an input pointer 4, an input 1 SAM portion 5, an input SAM portion 6 (or an input SAM portion 5, 6 in the case that the input SAM portions 5 and 6 are not separated), a data memory portion 7, an ALU array portion 8, an output 1 SAM portion 9, an output 2 SAM portion 10 (or a SAM portion 9, 10 in the case that the output SAM portions 9 and 10 are not separated), an output pointer 11, a program controlling portion 12, and an element processor group 13.

Next, the individual portions shown in FIG. 1 will be described.

Input Picture Data 1, Output Picture Data 15

The input picture data 1 is picture data that is actually processed. The output picture data 15 is picture data that has been processed. The data formats of the input picture data 1 and the output picture data 15 may be RGB format for a computer display or NTSC format for a TV signal. When one parallel processors is used as shown in FIG. 1, the size of the input picture data should be at most twice the number of element processors 13.

Input Frame Memory 2

The input frame memory 2 may be accomplished by a memory. Alternatively, the input frame memory 2 may be accomplished by software as a file.

The input frame memory 2 inputs the input picture data 1 and outputs data to the input 1 SAM portion 5 and the input 2 SAM portion 6.

At this point, the input frame memory 2 separates the input picture data 1 into data of even pixels and data of odd pixels. The input frame memory 2 supplies data of even pixels to the input 1 SAM portion 5. The input frame memory 2 supplies data of odd pixels to the input 2 SAM portion 6. In other words, assuming that pixels of input picture data are denoted by 0, 1, 2, 3, 4, 5, 6, 7, 8, 9, 10, . . . , data of the pixels 0, 2, 4, 6, 8, 10 . . . is supplied to the input 1 SAM portion. In contrast, data of the pixels 1, 3, 5, 7, 9, . . . is supplied to the input 2 SAM portion.

SIMD Picture Processor 3

The SIMD picture processor 3 may be accomplished by hardware. Alternatively, the SIMD picture processor 3 may be accomplished by software. The SIMD picture processor 3 inputs the input picture data through the input frame memory 2 and outputs the output picture data 15 through the output frame memory 14.

Input Pointer 4, Output Pointer 11

The input pointer 4 and the output pointer 11 are disposed in the SIMD picture processor 3. The input pointer 4 and the output pointer 11 may be accomplished by hardware memories. Alternatively, the input pointer 4 and the output pointer 11 may be accomplished by software.

When the write address of the ALU array portion 8 represents the input pointer 4, the input pointer 4 inputs the calculated result of the ALU array portion 8 and controls the input 1 SAM portion 5 and the input 2 SAM portion 6 corresponding to the calculated result of the ALU array portion 8. The input pointer 4 may be in common with the input 1 SAM portion 5 and the input 2 SAM portion 6. Alternately, two input pointers may be used for controlling the input 1 SAM portion 5 and the input 2 SAM portion 6.

When the write address of the ALU array portion 8 represents the output pointer 11, the output pointer 11 inputs the calculated result of the ALU array portion 8 and controls the output 1 SAM portion 9 and the output 2 SAM portion 10 corresponding to the calculated result of the ALU array portion 8. The output pointer 11 may be in common with the output 1 SAM portion 9 and the output 2 SAM portion 10. Alternatively, two output pointer may be used for controlling the output 1 SAM portion 9 and the output 2 SAM portion 10.

Next, with reference to FIGS. 2 and 3, the controlling method for the input SAM portions 5 and 6 and the output SAM portions 9 and 10 will be described.

FIG. 2 shows the structure of the input/output pointers. FIG. 2A shows a normal mode of the input/output pointers. In the normal mode, an IR (Input Register)/OR (Output Register) element is electrically connected.

Figure 2B:
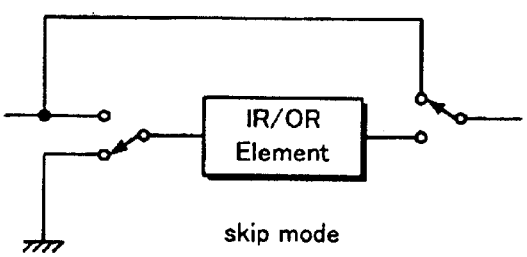

FIG. 2B shows a skip mode of the input/output pointers. In the skip mode, a path of an IR/OR element is skipped. A path of an IR/OR element is equivalent to one of the input SAM portions 5 and 6 and the output SAM portions 9 and 10.

FIG. 3 shows the relation between the input/output SAM portions 5 and 6 and the input/output pointers. FIG. 3A shows an example of input pixel data. In FIG. 3A, pixels are denoted by A, B, C, . . .

FIG. 3B shows the case that all IR/OR elements are in the normal mode. In this case, the input pixel data shown in FIG. 3A is successively input to each element.

FIG. 3C shows the case that the skip mode shown in FIG. 2B takes place in the ratio of one out of three. In this case, one out of three IR/OR elements is skipped. In FIG. 3C, the third IR/OR element is skipped. Thus, data of the pixel C is input to the fourth IR/OR element. In other words, input pixel data is successively shifted by one position.

FIG. 3D shows the case that the skip mode shown in FIG. 2B takes place in the ratio of one out of two. In this case, one out of two IR/OR elements is skipped. Thus, input pixel data is shifted at each skipped position.

Input 1 SAM Portion 5, Input 2 SAM Portion 6

The input 1 SAM portion 5 and the input 2 SAM portion 6 are disposed in the SIMD picture processor 3. The input 1 SAM portion 5 and the input 2 SAM portion 6 may be accomplished by hardware. Alternatively, the input 1 SAM portion 5 and the input 2 SAM portion 6 may be accomplished by software as files. The input 1 SAM portion 5 and the input 2 SAM portion 6 input picture data and output data to the data memory portion 7 corresponding to the input pointer 4.

Data Memory Portion 7

The data memory portion 7 is disposed in the SIMD picture processor 3. The data memory portion 7 may be accomplished by a hardware memory. Alternatively, the data memory portion 7 may be accomplished by software as a memory array. The data memory portion 7 is composed of a memory of several hundred bits per element processor. The data memory portion 7 stores data received from the input SAM portions 5 and 6 corresponding to control code received from the program controlling portion 12. In addition, the data memory portion 7 stores a calculated result of the ALU array portion 8 corresponding to data supplied thereto.

ALU Array Portion 8

The ALU array portion 8 is disposed in the SIMD picture processor 3. The ALU array portion 8 may be accomplished by hardware. Alternatively, the ALU array portion 8 may be accomplished by software. The ALU array portion 8 inputs data from the data memory portion 7 and writes the calculated result to an address pointer designated by the program controlling portion 12. When the address pointer represents the data memory portion 7, the calculated result is written to the designated address of the data memory portion 7. When the address pointer representes the input pointer 4 or the output pointer 11, the calculated result is written to the input pointer 4 or the output pointer 11, respectively.

Output 1 SAM Portion 9, Output 2 SAM Portion 10

The output 1 SAM portion 9 and the output 2 SAM portion 10 are disposed in the SIMD picture processor 3. The output 1 SAM portion 9 and the output 2 SAM portion may be accomplished by hardware. Alternatively, the output 1 SAM portion 9 and the output 2 SAM portion 10 may be accomplished by software as files. When the control code write address of the program controlling portion 12 represents the output SAM portions 9 and 10, the output SAM portions 9 and 10 input the calculated result of the ALU array portion 8 and supply the data to the output frame memory 14.

The output 1 SAM portion 9 supplies data of even pixels of the output picture data to the output frame memory 14. The output 2 SAM portion 10 supplies data of odd pixels of the output picture data to the output frame memory 14. In other words, when the pixels are denoted by 0, 1, 2, 3, 4, 5, 6, 7, 8, 9, 10, . . . , the output 1 SAM portion 9 supplies data of the pixels 0, 2, 4, 6, 8, 10, . . . to the output frame memory 14. The output 2 SAM portion 10 supplies data of the pixels 1, 3, 5, 7, 9, . . . to the output frame memory 14.

Program Controlling Portion 12

The program controlling portion 12 is disposed in the SIMD picture processor 3. The program controlling portion 12 may be accomplished by hardware. Alternatively, the program controlling portion 12 may be accomplished by software as a control code file. The program controlling portion 12 controls the input SAM portions 5 and 6, the data memory portion 7, the ALU array portion 8, and the output SAM portions 9 and 10 corresponding to a control code.

Element Processor Group 13

The element processor group 13 is a set of element processors corresponding to individual pixels. The element processors are composed of the input SAM portions 5 and 6, the data memory portion 7, the ALU array portion 8, and the output SAM portions 9 and 10 corresponding to the individual pixels. The size of a picture processed by one parallel processor depends on the number of element processors. Thus, according to the present invention, since there are two input phases and two output phases, a picture whose size is twice the number of element processors can be processed.

In the SIMD architecture, individual element processors generate respective program control codes so as to simultaneously perform their processes.

Output Frame Memory 14

The output frame memory 14 may be accomplished by a hardware memory. Alternatively, the output frame memory 14 may be accomplished by software as a file.

The output frame memory 14 inputs data from the output SAM portions 9 and 10 and generates output picture data. In this example, since the output 1 SAM portion 9 supplies data of even pixels and the output 2 SAM portion 10 supplies data of odd pixels, the output frame memory 14 combines the data of even pixels and the data of odd pixels and generates one sequence of output picture data.

FIGS. 4 to 14 are flow charts showing a control code generating algorithm in a two-input phase and two-output-phase structure (namely, in the structure of the parallel processor having the input 1 SAM portion 5, the input 2 SAM portion 6, the output 1 SAM portion 9, and the output 2 SAM portion 10 as shown in FIG. 1) according to an embodiment of the present invention.

Figure 4:
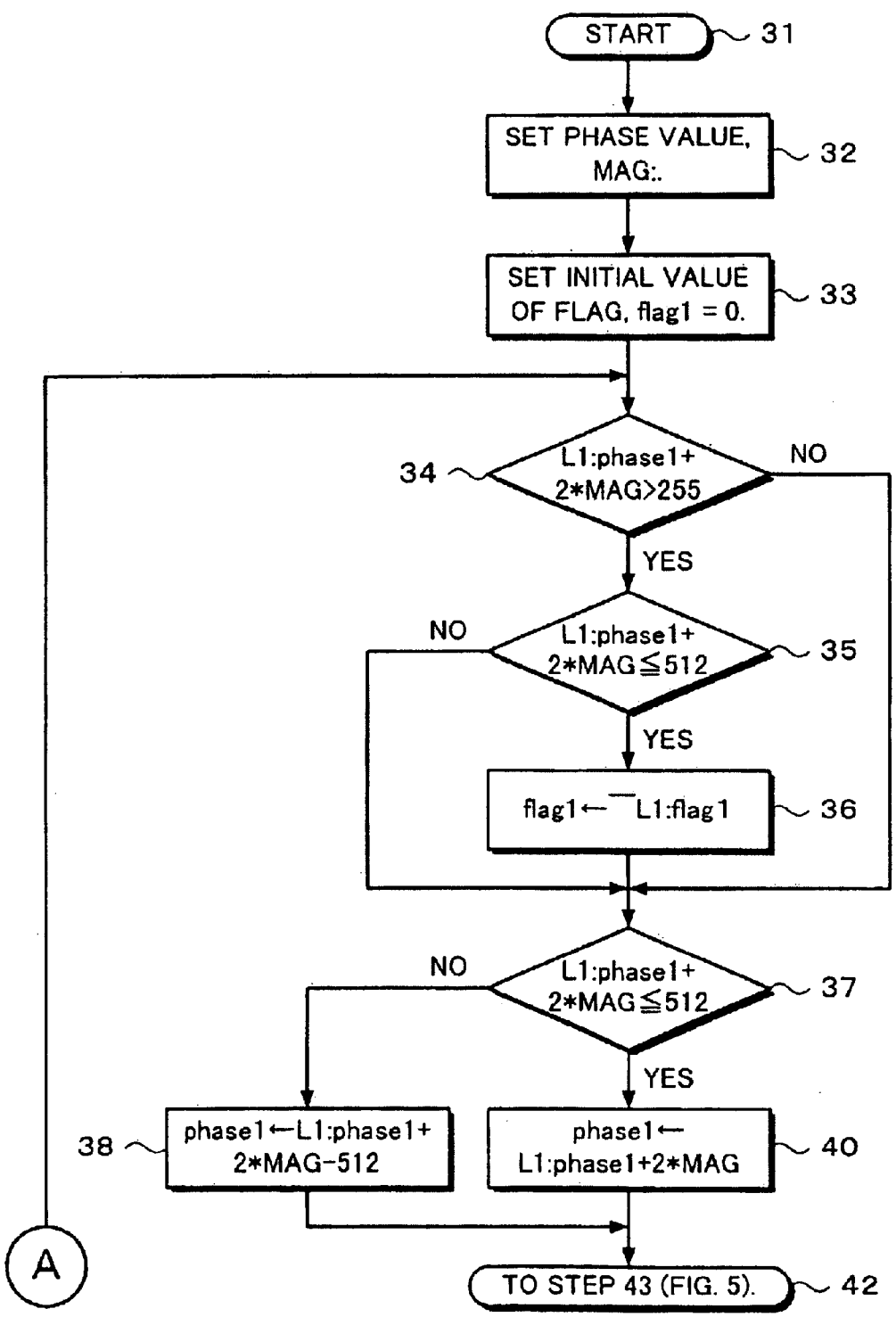
FIG. 4 is a flow chart for explaining an input pointer setting algorithm for an enlarging process in a two-input-phase and two-output-phase structure according to the present invention.
Figure 5:
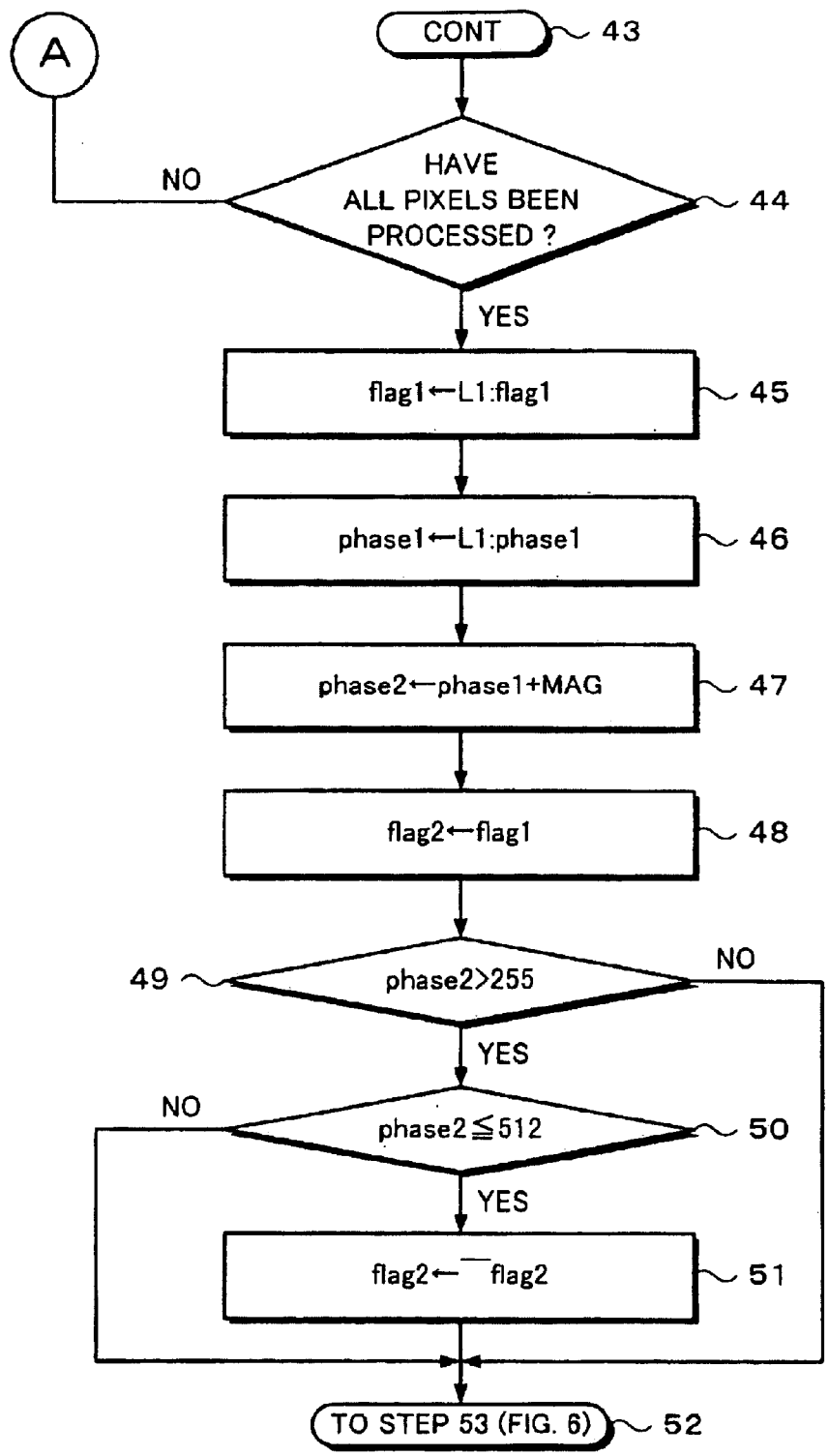
FIG. 5 is a flow chart for explaining an input pointer setting algorithm for an enlarging process in a two-input-phase and two-output-phase structure according to the present invention.
Figure 6:
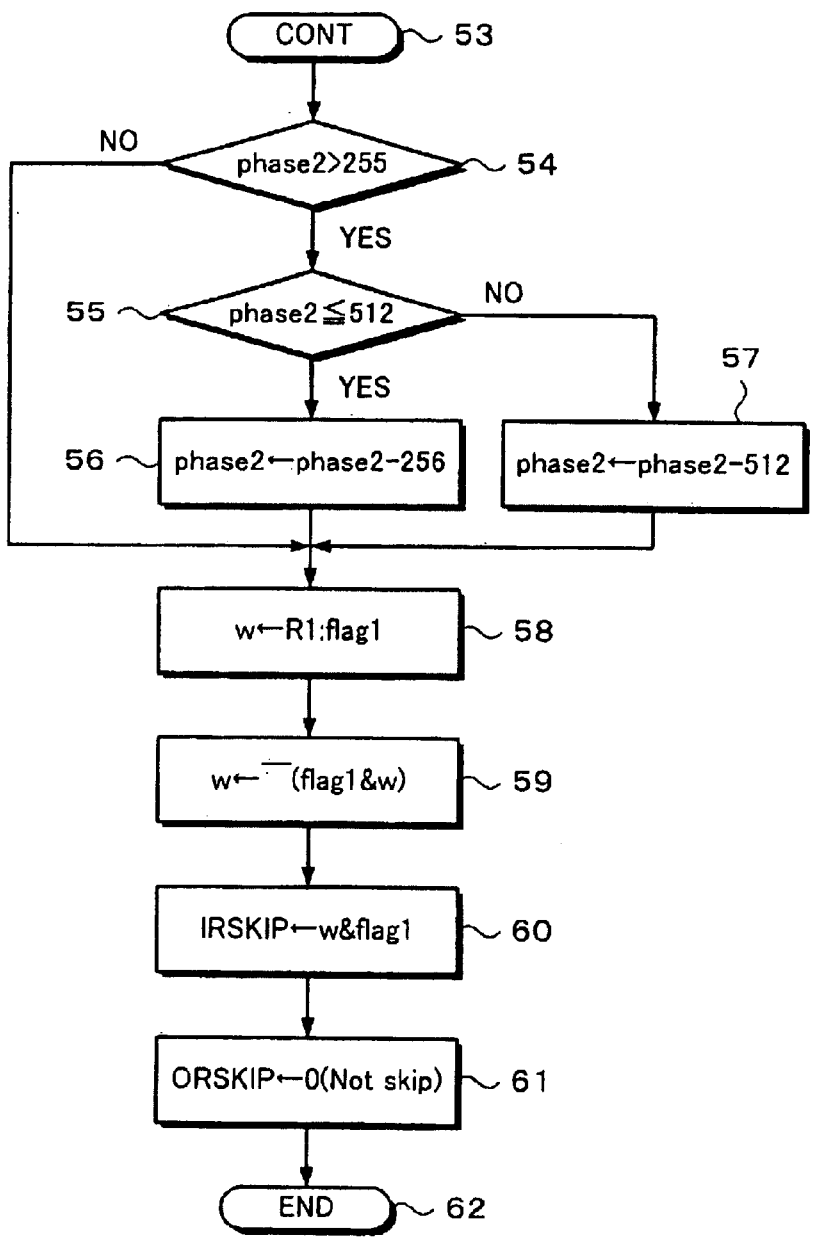
FIG. 6 is a flow chart for explaining an input pointer setting algorithm for an enlarging process in a two-input-phase and two-output-phase structure according to the present invention.

The flow charts of FIGS. 4 to 6 show an input pointer setting algorithm necessary for a pixel number converting process as an enlarging process in the two-input-phase and two-output-phase structure of the input SAM portions 5 and 6 and the output SAM portions 9 and 10 of the picture processor shown in FIG. 1. The input pointer setting algorithm is calculated and set by the program controlling portion 12 shown in FIG. 1. FIGS. 4 to 6 show a sequence of process steps. Due to the limitation of the drawing space, the input pointer setting algorithm is drawn on three drawings of FIGS. 4 to 6.

Figure 7:
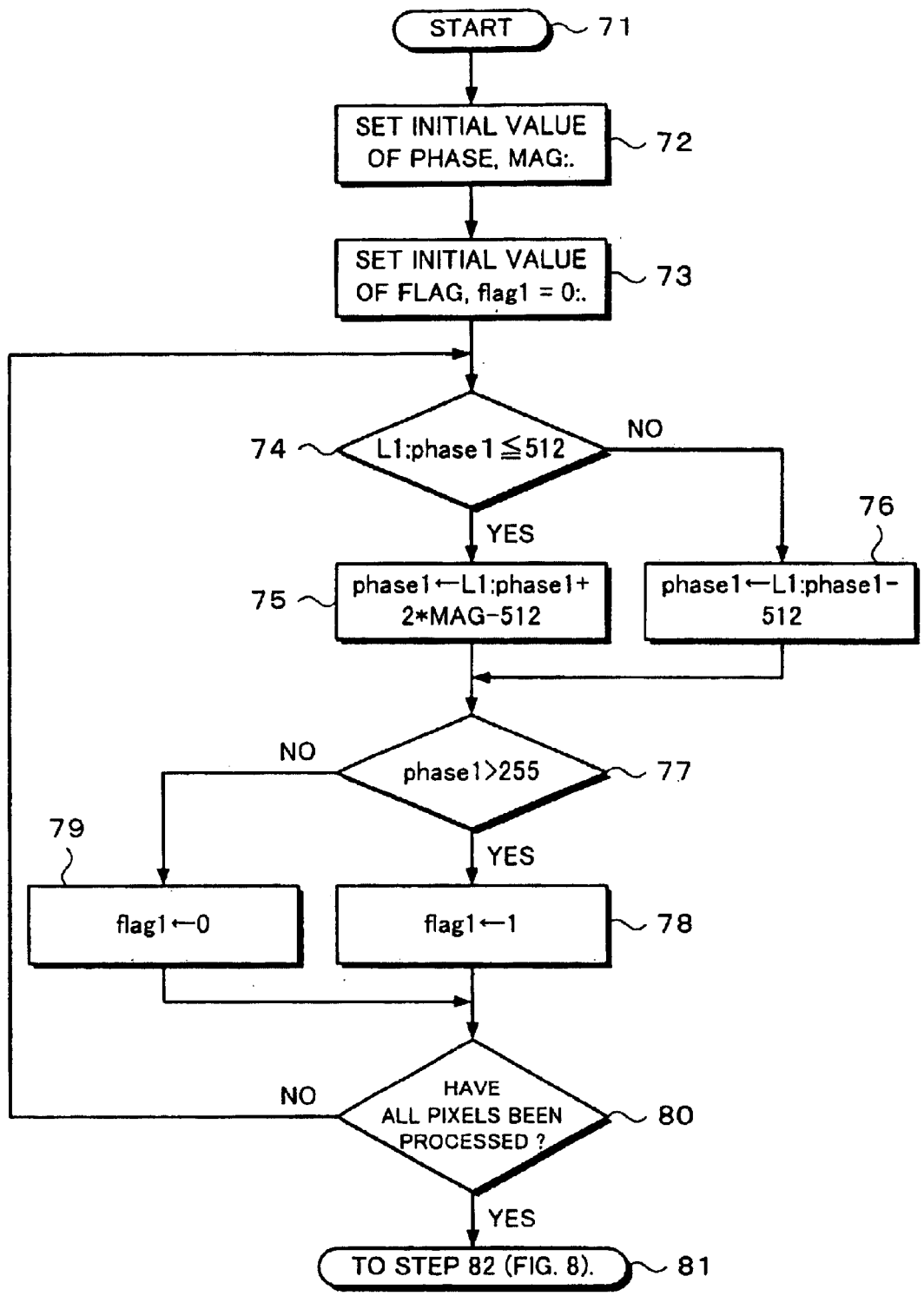
FIG. 7 is a flow chart for explaining an is output pointer setting algorithm for a reducing process in a two-input-phase and two-output-phase structure according to the present invention.
Figure 8:
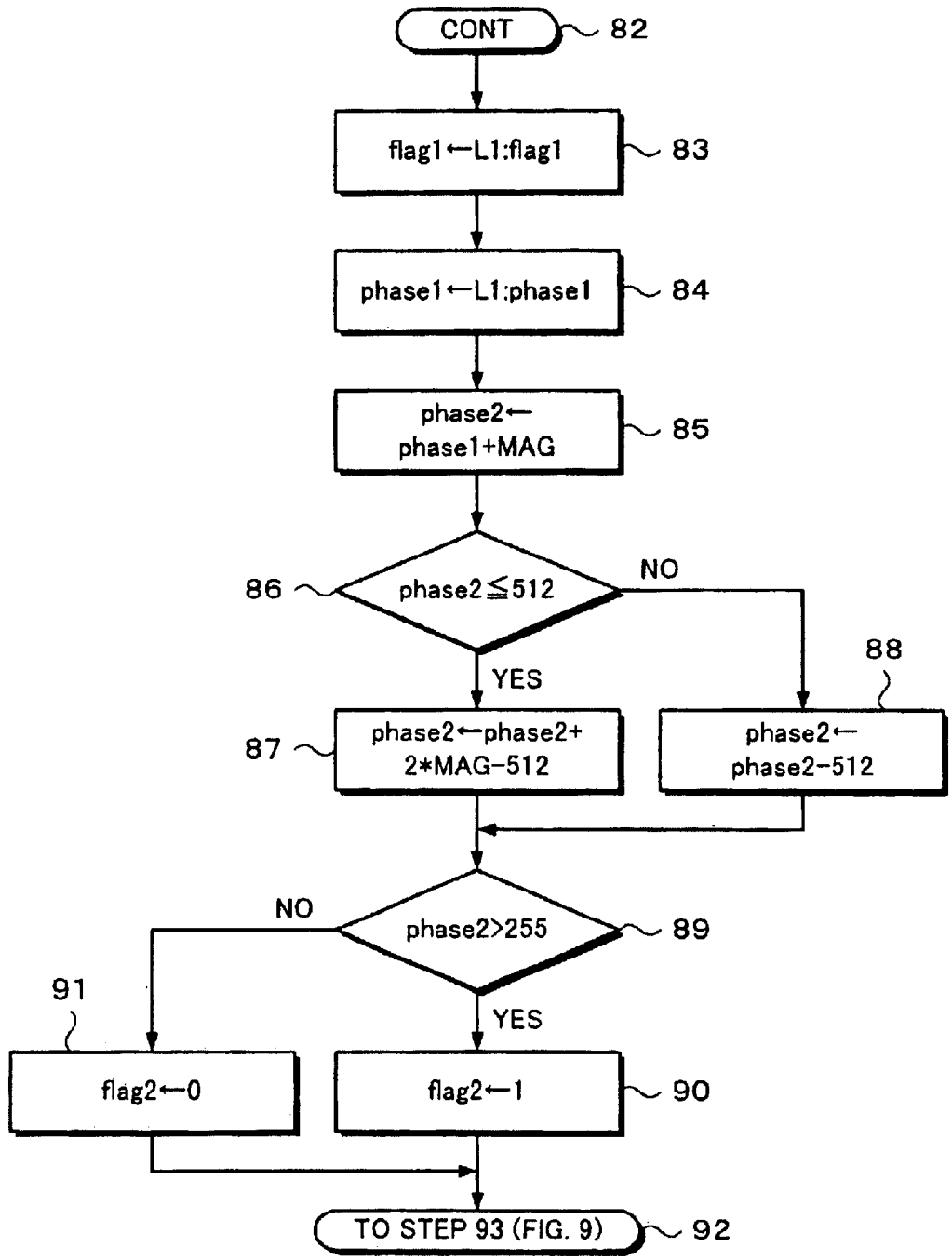
FIG. 8 is a flow chart for explaining an output pointer setting algorithm for a reducing process in a two-input-phase and two-output-phase structure according to the present invention.
Figure 9:
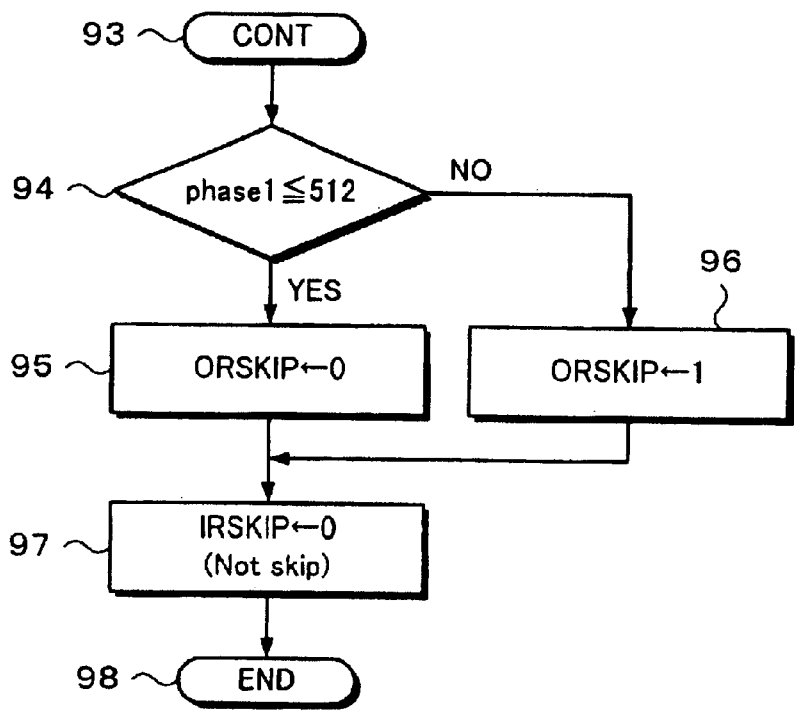
FIG. 9 is a flow chart for explaining an output pointer setting algorithm for a reducing process in a two-input-phase and two-output-phase structure according to the present invention.

FIGS. 7 to 9 are flow charts showing an output pointer setting algorithm necessary for a pixel number converting process as a reducing process in the two-input-phase and two-output-phase structure of the input SAM portions 5 and 6 and the output SAM portions 9 and 10 of the picture processor shown in FIG. 1. The output pointer setting algorithm is calculated and set by the program controlling portion 12 shown in FIG. 1. FIGS. 7 to 9 show a sequence of process steps. Due to the limitation of the drawing space, the output pointer setting algorithm is drawn on three drawings of FIGS. 7 to 9.

Figure 10:
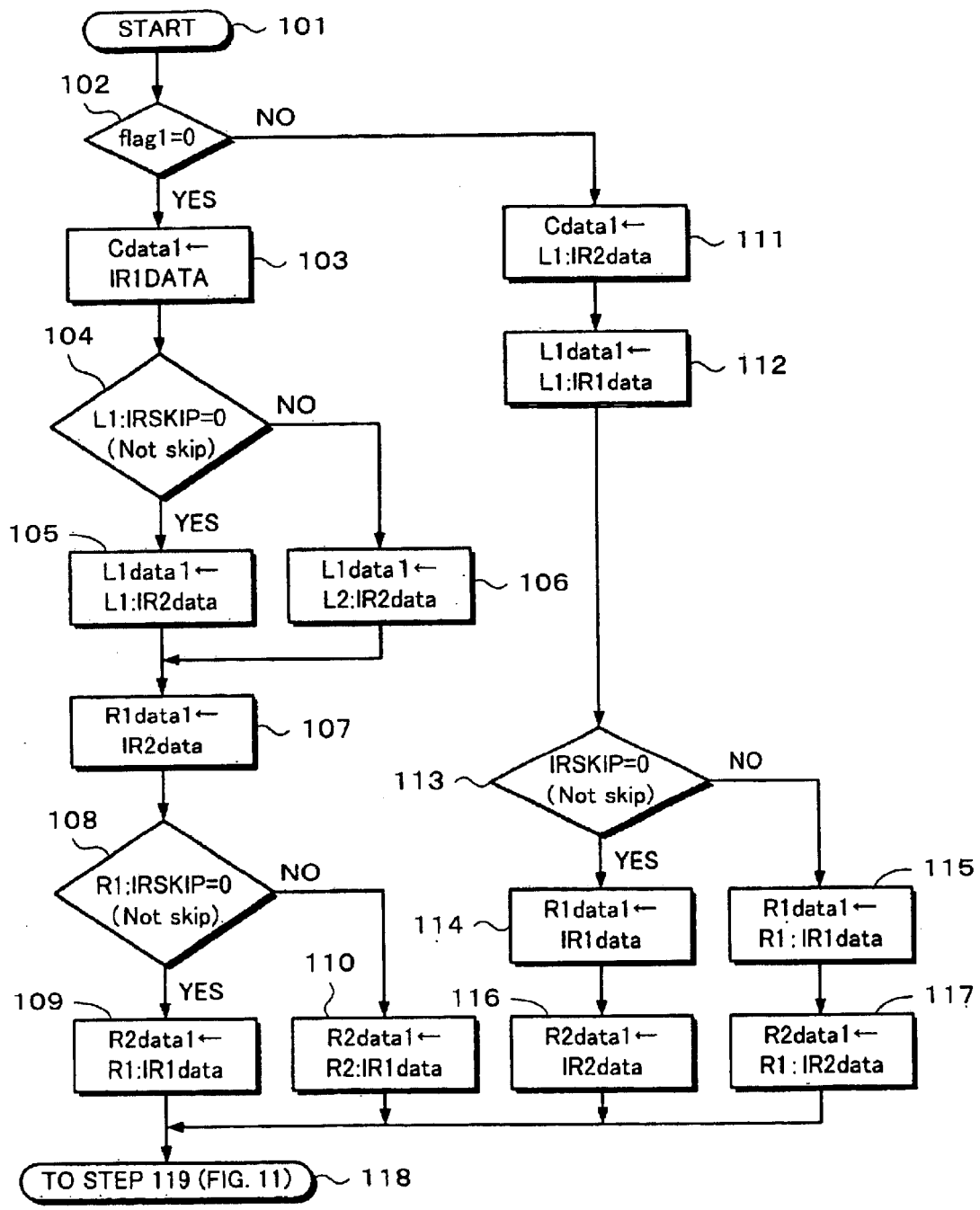
FIG. 10 is a flow chart for explaining an adjacent pixel (four pixel) extracting algorithm in a pixel number converting process to a preset input pointer.
Figure 11:
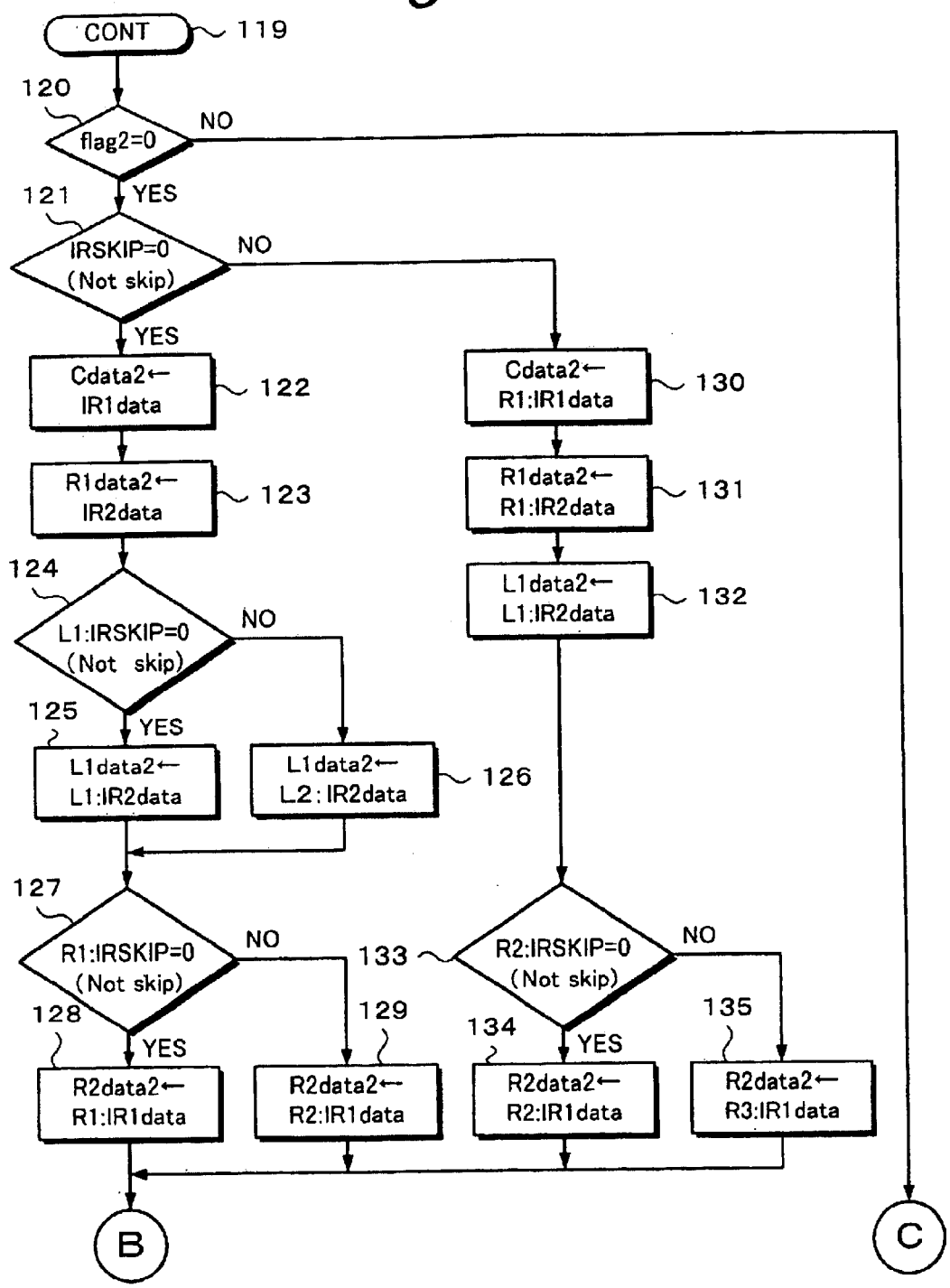
FIG. 11 is a flow chart for explaining an adjacent pixel (four pixel) extracting algorithm in a pixel number converting process to a preset input pointer.
Figure 12:
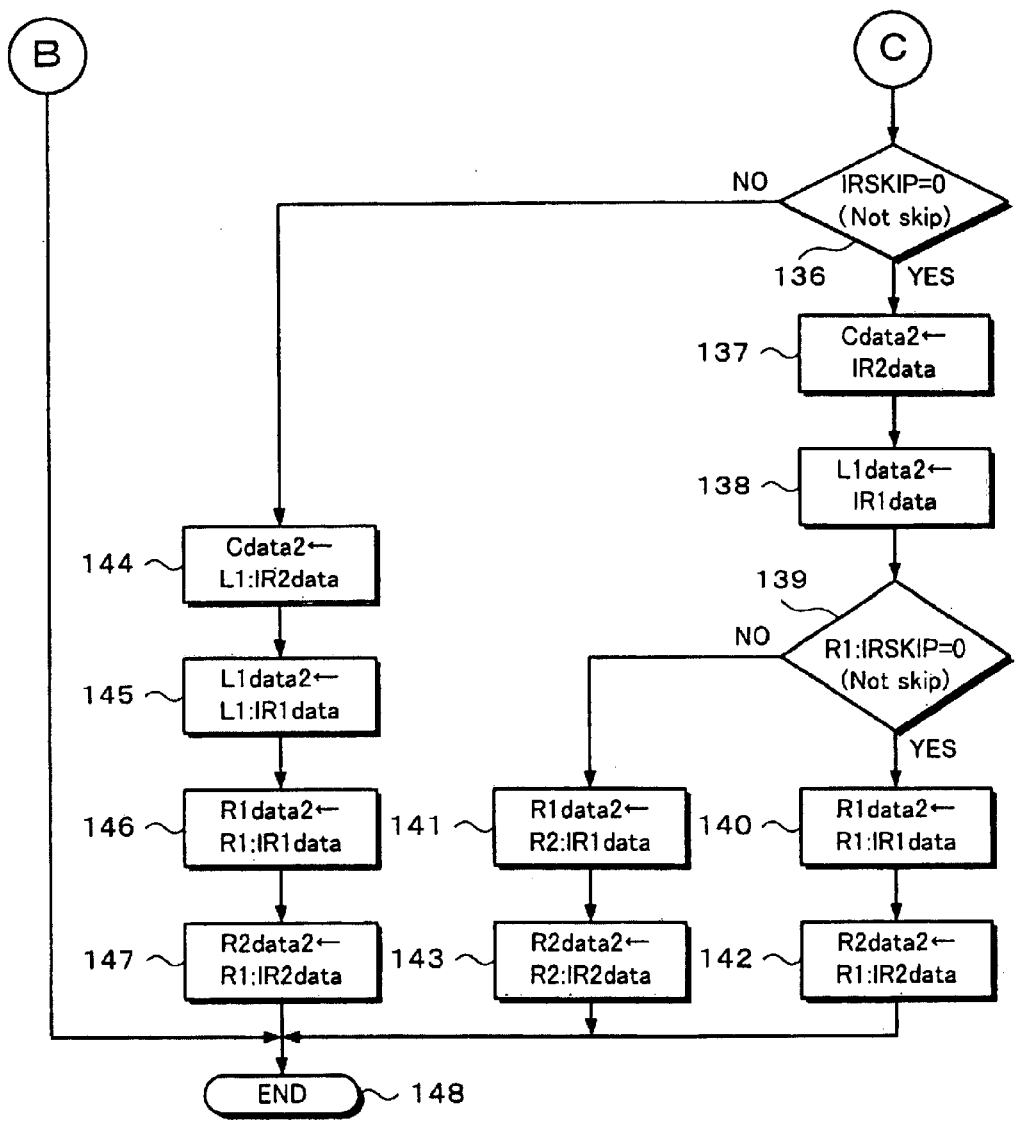
FIG. 12 is a flow chart for explaining an adjacent pixel (four pixel) extracting algorithm in a pixel number converting process to a preset input pointer.

FIGS. 10 to 12 are flow charts showing an adjacent four-pixel extracting algorithm for an input pointer that is set corresponding to the algorithm shown in FIGS. 4 to 6. (When a four-tap filter is used, a filter calculation is performed with adjacent four pixels.) FIGS. 10 to 12 show a sequence of process steps. Due to the limitation of the drawing space, the adjacent four-pixel extracting algorithm is drawn on three drawings of FIGS. 10 to 12.

Figure 13:
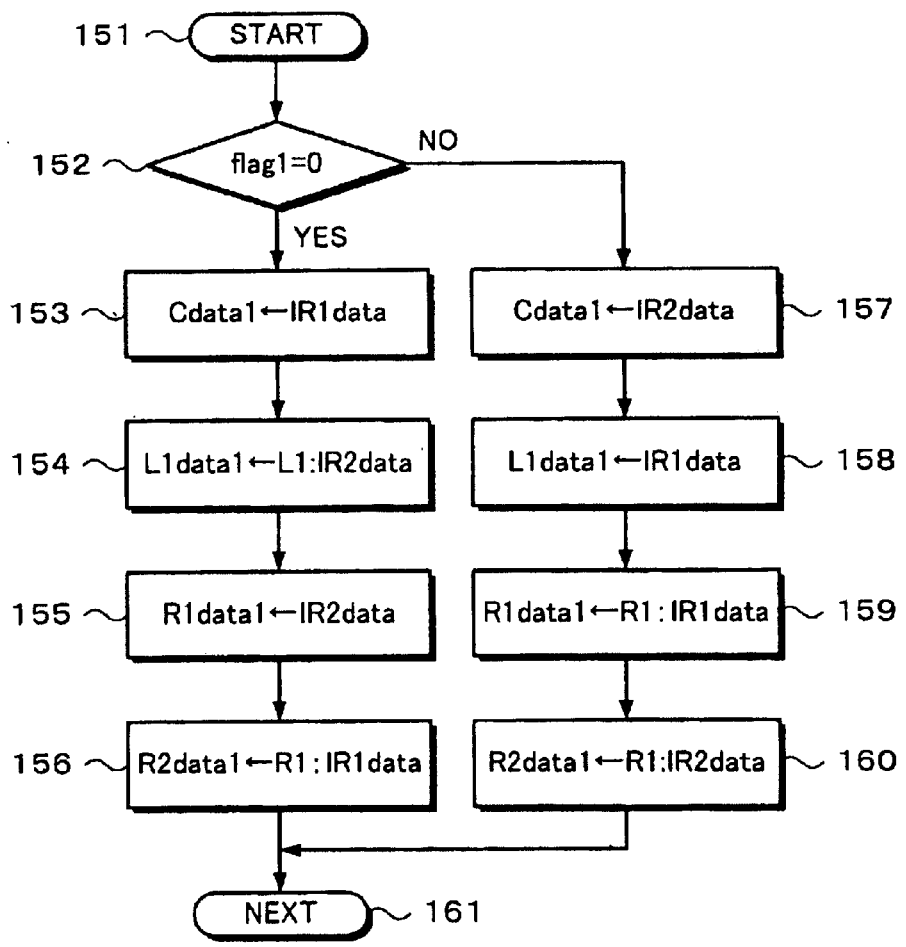
FIG. 13 is a flow chart for explaining an adjacent pixel (four pixel) extracting algorithm in a pixel number converting process to a preset output pointer.
Figure 14:
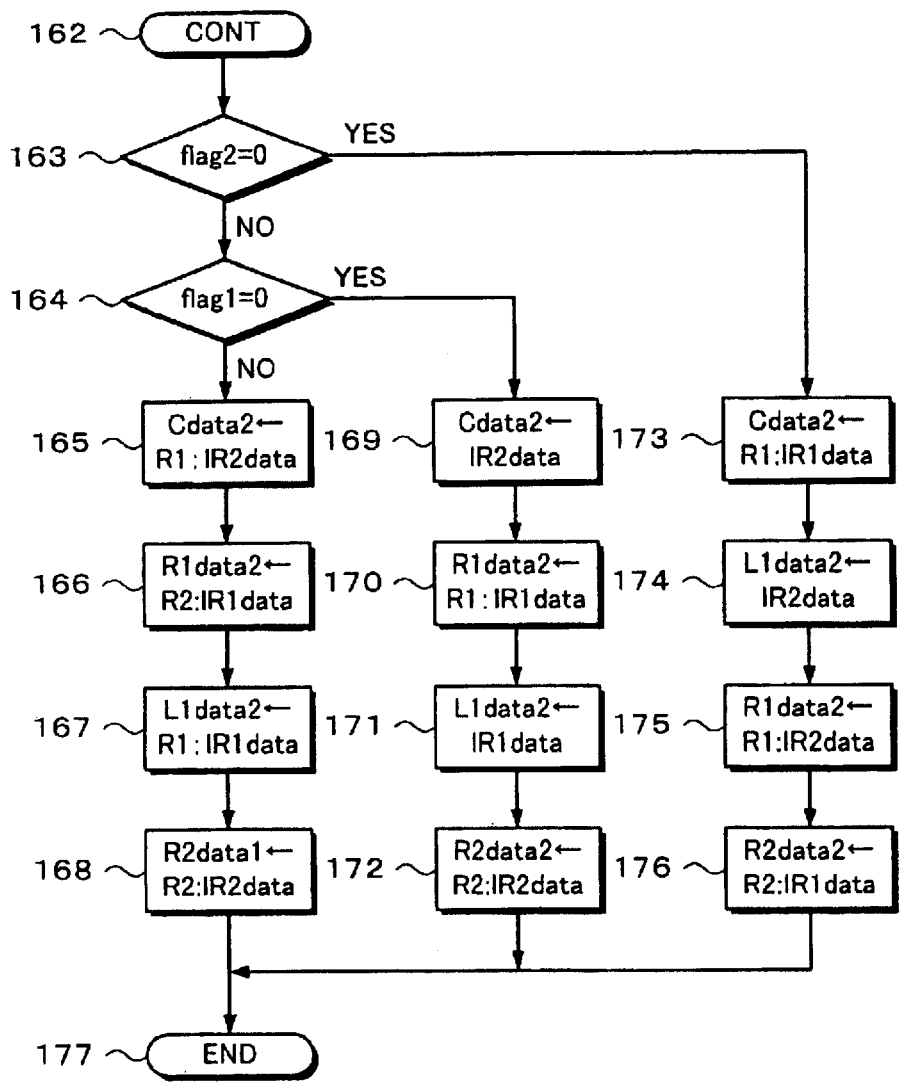
FIG. 14 is a flow chart for explaining an adjacent pixel (four pixel) extracting algorithm in a pixel number converting process to a preset output pointer.
Figure 18:
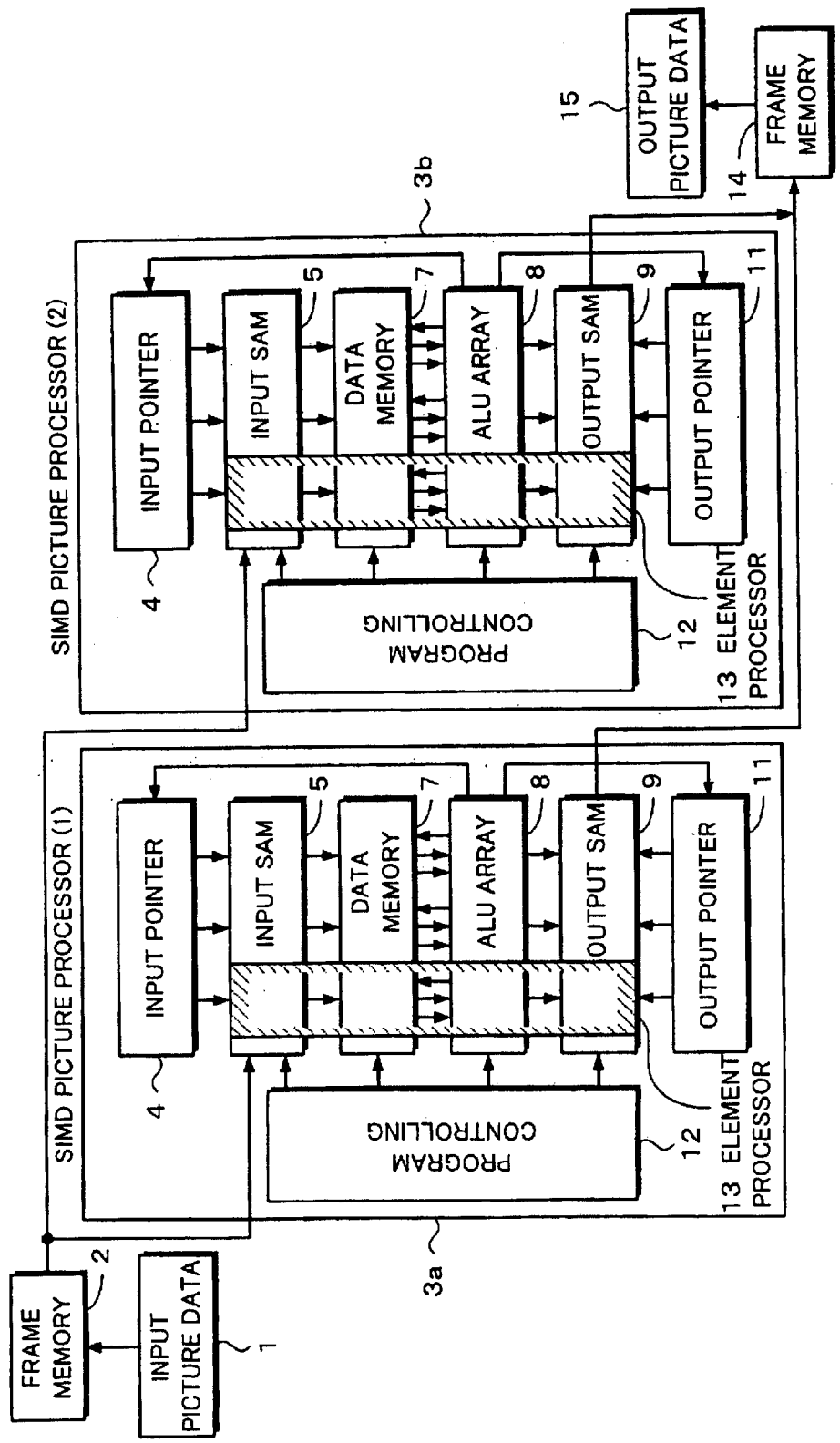
FIG. 18 is a block diagram showing an example of the structure of a picture processing apparatus having a conventional SIMD picture processor.

FIGS. 13 and 14 are flow charts showing an adjacent four-pixel extracting algorithm for an output pointer that is set corresponding to the algorithm shown in FIGS. 7 to 9. (When a four-tap filter is used, a filter calculation is performed with adjacent four pixels.) FIGS. 13 and 14 show a sequence of process steps. Due to the limitation of the drawing space, the algorithm is drawn on two drawings of FIGS. 13 and 14.

First of all, with reference to FIGS. 4 to 6, an IRSKIP (input pointer) setting algorithm for an enlarging process in the two-input-phase and two-output-phase structure will be described. This algorithm may be accomplished as a program control code generating program by software or hardware.

In FIGS. 4 to 6 and FIGS. 7 to 9, phase1 and flag1 are variables that are stored in the data memory portion 7 and used for a calculation in the output 1 SAM portion 9 of an element processor. Phase2 and flag 2 are also variables stored in the data memory portion 7 and used for a calculation in the output 2 SAM portion 10 of an element processor. (Although the data memory portion 7 is composed of one memory, for convenience, a variable that affects the output 1 SAM portion 9 is referred to as upper phase variable, whereas a variable that affects the output 2 SAM portion 10 is referred to as lower phase variable.)

At step 32 shown in FIG. 4, a phase value (MAG) is set. In this example, the number of which a phase is divided is 256. When the enlargement ratio is in the range from 1 time to 2 times, the relation of 128<MAG<256 is satisfied. The enlargement ratio is represented by 256/(MAG).

At step 33, the initial value of the upper phase data flag is set. The data flag is used to determine whether a pixel that is the reference of a phase value is in the input 1 SAM portion 5 or the input 2 SAM portion 6.

In the SIMD process, all element processors operate in the same manner. Thus, steps 34 to 44 are required. Steps 34 to 44 are performed by the data memory portion 7 and the ALU array portion 8. The variable name represents the address of the data memory portion 7.

At steps 34, 35, and 36, when the following relation is satisfied, the value of flag1 of the one-position left adjacent element processor is inverted and set to flag1.

$$255 < L1\text{:phase1} + 2^*MAG \leq 512$$

where L1:phase1 represents the value of phase1 of the one-position left adjacent element processor.

At step 36, "¯" of flag1←¯L1:flag1 represents an inversion; "L1" represents the one-position left adjacent pixel; and "R1" represents the one-position right adjacent pixel (these notations apply to the following description).

At steps 37, 38, and 40, the new phase1 of the current element processor is calculated.

When the following relation is satisfied, $$L1\text{:phase1} + 2^*MAG < 512$$

the following calculation is performed (at step 40).

$$\text{phase1} = L1\text{:phase1} + 2^*MAG$$

When the following relation is satisfied, $$L1\text{:phase1} + 2^*MAG > 512$$

the following calculation is performed (at step 38).

$$\text{phase1} = L1\text{:phase1} + 2^*MAG - 512$$

At step 44 (FIG. 5), it is determined whether or not all pixels have been processed (corresponding to the number of element processors). When the determined result at step 44 is No (namely, all pixels have not been processed), the flow returns to step 34 shown in FIG. 4. When the determined result at step 44 is Yes (namely, all pixels have been processed), the flow advances to step 45.

In the SIMD architecture, phase1 of one pixel can be settled with one operation. Thus, phase1 is successively settled from the leftmost pixel to the rightmost pixel.

At steps 45 and 46, the deviation between a flag and the initial value of phase1 is adjusted (the left end of the picture is used as a reference).

At step 47, the upper phase1 is set as a reference value to obtain the lower phase2. phase2 deviates from phase1 by MAG.

At step 48, flag2 that represents whether the center pixel of a lower phase interpolating calculation is in the upper phase of input picture or the lower phase thereof is initialized. flag2 is calculated corresponding to the value of flag1.

At steps 49, 50, and 51, when the following relation is satisfied, $$255 < phase2 \leq 512$$

the value of flag2 is inverted and set to flag2. Otherwise, the value of flag2 is not changed. Thus, flag2 that determines the center pixel of the lower phase has been set.

At steps 54, 55, 56, and 57 shown in FIG. 6, the value of phase2 is adjusted so that the following relation is satisfied.

$$0 < phase2 < 256$$

In other words, when the following relation is satisfied, $$255 < phase2 \leq 512$$

the following calculation is performed (at step 56).

$$phase2 = phase2 - 256$$

When the following relation is satisfied, $$512 < phase2$$

the following calculation is performed (at step 57).

$$phase2 = phase2 - 512$$

At steps 58, 59, 60, and 61, an input pointer (1-bit) is set for the enlarging process of a set of element processors. In this example, an input pointer is represented by IRSKIP. When the value of IRSKIP is 0, the normal mode shown in FIG. 2A takes place. When the value of IRSKIP is 1, the skip mode shown in FIG. 2B takes place.

At step 58, the value of flag1 of the one-position right adjacent element processor is set to w. At step 59, flag1 and w are ANDed. The result is inverted and set to w.

At step 60, w and flag1 are ANDed and set to IRSKIP. The relation between flag1 and IRSKIP is as follows:

| flag1: | 001101001100110 |
|---|---|
| IRSKTP: | 000100000100010 |
| ORSKIP: | 000000000000000 |

The skip mode corresponding to IRSKIP is set to the input 1 SAM portion 5 and the input 2 SAM portion 6. The input data is widened and interpolated as an enlarging process.

At step 61, 0 is set to ORSKIP (output pointer). Thus, in the enlarging process, the normal mode shown in FIG. 2A is always set.

Next, with reference to flow charts shown in FIGS. 7 to 9, an ORSKIP (output pointer) setting algorithm for a reducing process in a two-input phase and two-output-phase structure will be described.

At steps 72 and 73 shown in FIG. 7, the phase and flag1 are initialized.

At steps 74, 75, and 76, the new phase1 is calculated. When the following relation is satisfied, $$L1:phase1 \leq 512$$

the following calculation is performed (at step 75).

$$phase1 = L1:phase1 + 2*MAG - 512$$

Otherwise, the following calculation is performed (at step 76).

$$phase1 = L1:phase1 - 512$$

At steps 77, 78, and 79, flag1 corresponding to the obtained phase1 is determined.

When the following relation is satisfied, $$phase1 > 255$$

1 is set to flag1 (namely, flag1=1) (at step 78).

Otherwise, 0 is set to flag1 (namely, flag1=0) (at step 79).

In the reducing process, when the value of flag1 is 0, the memory portion of each element processor uses the upper phase of the input data as center data of interpolation. When the value of flag1 is 1, the memory portion of each element processor uses the lower phase of the input data as center data of interpolation or skips it.

At step 80, it is determined whether or not all pixels have been processed (corresponding to the number of element processors). When the determined result at step 80 is No (namely, all pixels have not been processed), the flow returns to step 74. When the determined result at step 80 is Yes (namely, all pixels have been processed), the flow advances to step 81.

At steps 83 and 84 shown in FIG. 8, as with the algorithm shown in FIGS. 4 and 5, the leftmost pixel is treated as the center pixel. At step 83, the value of flag1 of the one-position left adjacent element processor is set to flag1. At step 83, the value of phase1 of the one-position left adjacent element processor is set to phase1.

At step 85, the value of phase2 is obtained with phase1 as follows.

$$phase2 = phase1 + MAG$$

At steps 86, 87, and 88, the value of phase2 calculated at step 85 is adjusted in a predetermined range. In other words, when the following relation is satisfied, $$phase2 \leq 512$$

the following calculation is performed (at step 87)

$$phase2 = phase2 + 2*MAG - 512$$

Otherwise, the following calculation is performed (at step 88).

$$phase2 = phase2 - 512$$

At steps 89, 90, and 91, the value of flag2 is calculated with the value of phase2 as follows.

When the following relation is satisfied, $$phase2 > 255$$

1 is set to flag2 (namely, flag2=1) (at step 90).

Otherwise, 0 is set to flag2 (namely, flag2=0) (at step 91).

At steps 94, 95, and 96 shown in FIG. 9, the output pointer (ORSKIP) is set.

When the following relation is satisfied, $$phase1 \leq 512$$

0 is set to ORSKIP (namely, ORSKIP=0, the normal mode is set) (at step 95).

When the following relation is satisfied, $$phase1 > 512$$

1 is set to ORSKIP (namely, ORSKIP=1, the skip mode is set) (at step 96).

At step 97, 0 is set to IRSKIP (input pointer). Thus, in the reducing process, the normal mode shown in FIG. 2A is set.

Since the output pointer (ORSKIP) is set in such a manner, element processors are not affected by output data. Thus, the reducing process is performed.

Next, with reference to flow charts shown in FIGS. 10 to 12, an adjacent pixel (four pixel) extracting algorithm for an enlarging process in a two-input-phase and two-output-phase structure will be described. It is assumed that an input pointer has been set corresponding to the algorithm shown in FIGS. 4 to 6. In the SIMD architecture, since all element block groups operate in the same manner, in the adjacent pixel extracting algorithm, the input pointer setting algorithm shown in FIGS. 4 to 6 is important.

Cdata1, L1data1, R1data1, and R2data1 used in the algorithms shown in FIGS. 10 to 12, 13, and 14 are adjacent pixel data used in an interpolating calculation of the output 1 SAM portion 9. By a sum-of-product calculation of the four data pieces and a filter coefficient, the result of the output 1 SAM portion 9 is obtained.

Likewise, Cdata2, L1data2, R1data2, and R2data2 are adjacent pixel data pieces used in an interpolating calculation of the output 2 SAM portion 10. By a sum-of-product calculation of the four data pieces and a filter coefficient, the result of the output 2 SAM portion 10 is obtained.

FIG. 10 is a flow chart showing an algorithm for extracting adjacent pixels of an upper phase. FIGS. 11 and 12 are flow charts showing an algorithm for extracting adjacent pixels of a lower phase. IR1data is input data of the input 1 SAM portion 5 that is an upper phase. IR2data is input data of the input 2 SAM portion 6 that is a lower phase.

At step 102, depending on the value of flag1, the flow branches to two ways. When the value of flag1 is 0, center data is in the upper phase of input data. When the value of flag1 is 1, center data is in the lower phase of input data.

When the value of flag 1 is 0 (namely, flag1=0), the flow advances to step 103. At step 103, center data (Cdata1) is extracted.

At steps 104, 105, and 106, corresponding to the state of the input pointer of the one-position left adjacent element processor, the one-position left adjacent pixel data (L1data1) is extracted.

At step 107, the one-position right adjacent pixel data (R1data1) is extracted. Since the center is data of the upper phase of the current element processor, the one-position right adjacent pixel data is data of the lower phase of the current element processor.

At steps 108, 109, and 110, corresponding to the state of the input pointer of the one-position right adjacent element processor, the two-position right adjacent pixel data (R2data1) is extracted.

When the value of flag1 is 1 (namely, flag1=1) at step 102, the flow advances to step 111. At step 111, the center pixel data (Cdata1) is extracted. When the value of flag1 is 1 (namely, flag1=1), the input pointer is set so that the lower position of the one-position left adjacent element processor (L1:) becomes the center.

At step 112, the one-position left adjacent pixel data (L1data1) is extracted.

At steps 113, 114, 115, 116, and 117, corresponding to the state of the input pointer of the current element processor, the one-position right adjacent pixel data (R1data1) and the two-position right adjacent pixel data (R2data1) are extracted.

At step 120 and later steps (FIG. 11), adjacent pixel data of the lower phase is extracted.

At step 120, corresponding to the value of flag2, the flow branches to two ways. When the value of flag2 is 0 (namely, flag2=0), the flow advances to step 121. At step 121, corresponding to the state of the input pointer IRSKIP of the current element processor, the flow branches to two ways.

When the value of the input pointer of the current element processor is not 1, the flow advances to step 122. At step 122, center data (Cdata2) of the lower phase is extracted. At step 123, the one-position right adjacent pixel data (R1data2) is extracted.

At steps 124, 125, and 126, corresponding to the state of the input pointer of the one-position left adjacent element processor, the one-position left adjacent pixel data (L1data2) is extracted.

At steps 127, 128, and 129, corresponding to the state of the input pointer of the one-position right adjacent element processor, the two-position right adjacent pixel data (R2data) is extracted.

When the value of flag2 at step 120 is 0 (namely, flag2=0), the flow advances to step 130. In other words, when the value of flag2 is 0 and the value of the input pointer of the current element processor is 1 (in the skip mode), adjacent pixel data is extracted at steps 130 to 135.

At step 130, center pixel data (Cdata2) is extracted. At step 131, the one-position right adjacent pixel data (R1data2) is extracted. At step 132, the one-position left adjacent pixel data (L1data2) is extracted.

At steps 133, 134, and 135, corresponding to the state of the input pointer of the two-position right adjacent element processor, the two-position right adjacent pixel data (R2data2) is extracted.

When the value of flag2 at step 120 is 1 (namely, flag2=1), the flow advances to step 136 shown in FIG. 12. At step 136, corresponding to the value of the input pointer IRSKIP of the current element processor, the flow branches to two ways.

When the input pointer of the current element processor is in the normal mode shown in FIG. 2A, the flow advances to step 137.

At step 137, center data (Cdata2) is extracted. At step 138, the one-position left adjacent pixel data (L1data2) is extracted.

At steps 139, 140, 141, 142, and 143, corresponding to the state of the input pointer of the one-position right adjacent element processor, the one-position right adjacent pixel data (R1data2) and the two-position right adjacent pixel data (R2data2) are extracted.

When the state of the input pointer of the current element processor at step 138 is in the skip mode shown in FIG. 2B, adjacent pixel data is extracted at steps 144, 145, 146, and 147.

Next, with reference to flow charts shown in FIGS. 13 and 14, an adjacent pixel extracting algorithm for a reducing process in a two-input-phase and two-output-phase structure will be described. In this example, it is assumed that flag1, flag2, and an output pointer have been set corresponding to the algorithm shown in FIGS. 7 to 9. In the algorithm shown in FIGS. 13 to 14, the same variables as the algorithm shown in FIGS. 10 to 12 are used.

FIG. 13 is a flow chart showing an adjacent pixel data extracting algorithm for an upper phase. FIG. 14 is a flow chart showing an adjacent pixel data extracting-algorithm for a lower phase.

At step 152 shown in FIG. 13, corresponding to the value of flag1, the flow branches to two ways.

When the value of flag1 at step 152 is 0 (namely, flag1=0), adjacent pixel data is extracted at steps 153, 154, 155, and 156.

When the value of flag1 at step 152 is 1 (namely, flag1=1), adjacent pixel data is extracted at steps 157, 158, 159, and 160.

At steps 163 and later steps (FIG. 14), the adjacent pixel data of the lower phase is extracted.

When the value of flag2 at step 163 is 1 (namely, flag2=0) and the value of flag1 at step 164 is 1 (flag1=0), adjacent pixel data is extracted at steps 165, 166, 167, and 168.

When the value of flag2 at step 163 is 1 (namely, flag2=1) and the value of flag1 at step 164 is 0 (namely, flag1=0), adjacent pixel data is extracted at steps 169, 170, 171, and 172.

When the value of flag2 at step 163 is 0 (namely, flag2=0), adjacent pixel data is extracted at steps 173, 174, 175, and 176.

Figures 15A, 15B:
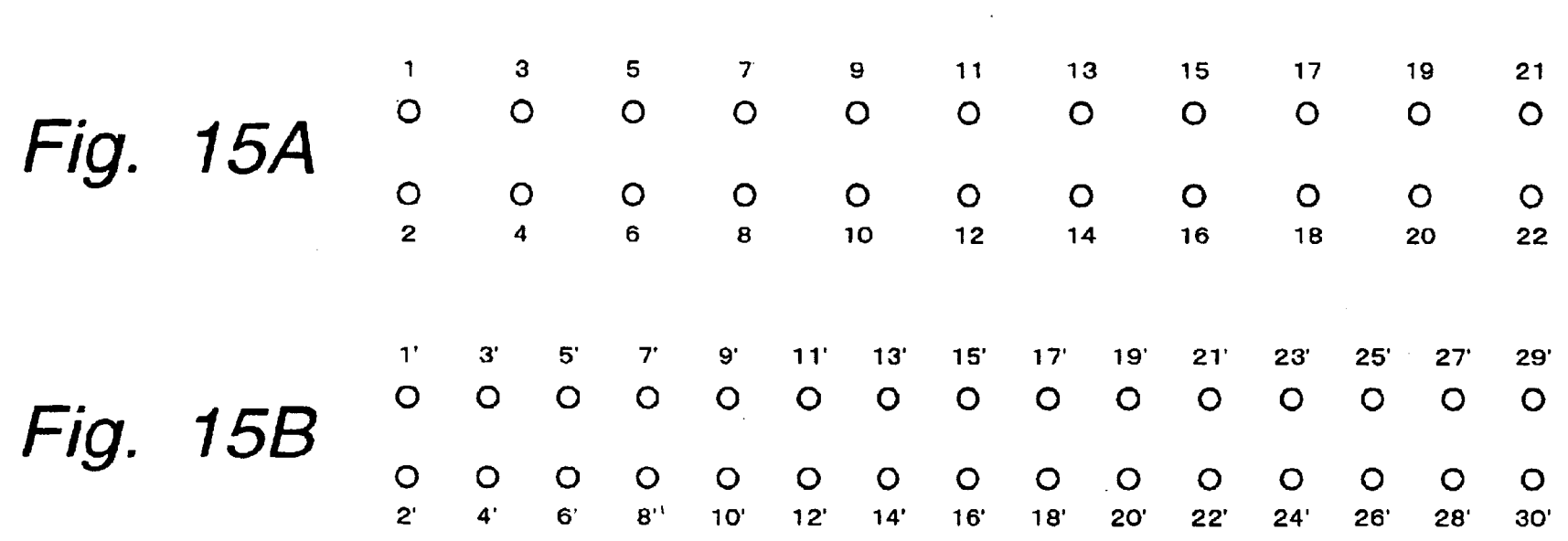

Next, the above-described embodiment of the present invention will be described in detail. It is assumed that with input data shown in FIG. 15A, output data shown in FIG. 15B is generated. Referring to FIGS. 15A and 15B, since the input data is composed of 22 pixels and the output data is composed of 30 pixels, four pixels of output data are generated with three pixels of the input data. In other words, an interpolating calculation of 3:4 is performed.

In this example, at the phase value setting step (step 32 shown in FIG. 4), assuming that data is divided by 256, the value of MAG is given as follows.

MAG=256*3/4=192

At step 33 (flag initial value setting step), the values of flag1 and phase1 of each element processor (denoted by PE in FIG. 16) are set to 0. In other words, in this state, the values of the memories of all the element processors are 0.

At steps 34, 35, and 36, the value of flag1 of all the element processors becomes 1. At steps 37 and 40, the value of phase1 of all the element processors becomes 384.

When the loop of steps 34, 35, and 36 is repeated, the value of flag1 of the leftmost element processor is the same as that of the preceding operation. However, the values of flag1 and phase1 of the other element processors become 1 and 256, respectively. The values of flag1 and phase1 of the left of the leftmost element processor are always 0 (because of no element processor).

When the loop is repeated again, the values of flag1 and phase1 of the element processors become "1, 1, 0, 0, 0, 0, . . . " and "384, 256, 128, 128, 128, . . . ", respectively. Thus, whenever the loop is repeated, the values of flag1 and phase1 of the element processors are settled one by one as shown in FIG. 16.

Next, at steps 45 and 46, the phase origin is matched to the leftmost element processor. At steps 48, 49, 50, and 51, the value of flag2 is determined corresponding to the value of phase1+MAG as follows.

if (255<phase1+MAG<512) The inverted value of flag1 is set to flag2.
else The value of flag1 is set to flag2.

At step 47 (FIG. 5) and steps 54, 55, 56, and 57 (FIG. 6), the value of the lower phase (phase2) is calculated with the value of the upper phase (phase1) as follows.

if (255 < phase1 + MAG < 512) phase2 = phase1 + MAG − 256
    else if (255 > phase1) phase2 = phase1 + MAG
    else phase2 = phase1 + MAG − 512

The value of the input pointer IRSKIP is determined with the values of the determined flag1, flag2, phase1, and phase2.

At steps 58, 59, and 60,
IRSKIP={inverted value of (flag1 & R1:flag1)} & flag1

In the case of the enlarging process, 0 is set to the output pointer (ORSKIP). By repeating the loop the number of times corresponding to the number of element processors, the final result shown in FIG. 17 is obtained.

In FIG. 17, output data 1', 2', 3', . . . , and so forth are obtained by performing an interpolating calculation with input data. The pixel data used in the interpolating calculation is selected corresponding to the algorithm shown in FIGS. 10 to 14.

FIG. 10 shows an adjacent pixel extracting algorithm for performing an interpolating calculation for upper phase data of output data.

When the value of flag1 is 0, center data for the interpolating calculation is above the current element processor. When the value of flag1 is 1, center data for the interpolating process is at the lower left position of the current element processor.

The output data of the upper phase data of the n-th element processor is 2n−1. The output data of the lower phase data of the n-th element processor is 2n+1. Assuming that the upper phase data and the lower phase data of the input data of the n-th element processor are i(n) and j(n), respectively, the following relation is satisfied.

if(flag(n)==1) Cdate (center data of interpolating calculation) = i (n)
    else Cdata (center data of interpolating calculation) = j (n−1)

The other three points are selected corresponding to the value of the input pointer based on the above-described rule.

For example, by applying the rule, data necessary for obtaining output data 15' shown in FIG. 17 is given as follows.

Cdata=11, L1data=10, R1data=12, R2data=13

Data necessary for obtaining output data 17' is given as follows.

Cdata=12, L1data=11, R1data=13, R2data=14

FIGS. 11 and 12 show a interpolation data selecting algorithm for obtaining output data of lower phase data. The algorithm is controlled corresponding to the values of flag1, flag2, and input pointer.

As described above, with a picture processing apparatus having a parallel processor in a two-phase structure and a frame memory that separates picture data into two phases and combines two-phase data and an algorithm for processing a picture of two-phase data, when a picture process (in particular, pixel number converting process) is performed, the following effects are obtained.

With one parallel processor, a picture whose size is twice as large as the conventional apparatus can be handled. Thus, in the apparatus according to the present invention, the number of parallel processors can be halved.

The overall circuit structure of the apparatus according to the present invention can be reduced in comparison with the conventional apparatus.

With a picture number converting algorithm for two-phase data is established, a pixel number converting process for two-phase data can be performed at any ratio.

What is claimed is:

1. A digital signal processing apparatus for parallel executing a plurality of data processes with a single common command, comprising:
    a plurality of input storing means, each of which is composed of a plurality of storing elements;
    input controlling means for controlling said input storing means, including selecting whether to skip a storing element in each input storing means while storing data to said input storing means;
    calculating means, having a plurality of element calculating means corresponding to the plurality of the storing elements of said input storing means, for parallel calculating data stored in each storing element of said input storing means;
    data storing means, having a plurality of storing elements corresponding to the plurality of element calculating means of said calculating means, for storing calculated result data of the element calculating means corresponding to the storing elements of the input storing means;
    a plurality of output storing means, each of which is composed of a plurality of storing elements corresponding to the plurality of element calculating means of said calculating means, for storing the calculated result data;
    output controlling means for controlling said output storing means; and
    controlling means for controlling said input storing means, said calculating means, said data storing means, and said output storing means corresponding to a control program.

2. The digital signal processing apparatus as set forth in claim 1, wherein input data as serial data is converted into parallel data and assigned to said input storing means.

3. The digital signal processing apparatus as set forth in claim 1,
    wherein input data is picture data,
    wherein said input controlling means has:
        skip operating means for determining to supply picture data to the storing elements of said input storing means corresponding to the element calculating means of said calculating means or skip the picture data thereof; and
    pixel extracting means for extracting adjacent pixel data of an object pixel as the center position for an interpolating calculation for the picture data, and
    wherein said calculating means has:
        first flag means representing a first flag that represents data inputting means to which the object pixel has been assigned; and
        second flag means for calculating a second flag for controlling said skip operating means of said input controlling means corresponding to the first flag of said first flag means.

4. The digital signal processing apparatus as set forth in claim 3,
    wherein said output controlling means has:
        output operating means for determining whether or not to output calculated result data stored in the storing elements of said output storing means corresponding to the element calculating means of said calculating means, and
    wherein said calculating means has:
        third flag means for calculating a third flag for controlling the output operating means of said output controlling means corresponding to the first flag of said first flag means.

5. A digital signal processing method, comprising:
    (a) separating a sequence of data into at least first and second disjoint sets, said sequence of data including a plurality of input data elements, each disjoint set having a plurality of output data elements, wherein separation includes determining whether to assign said input data element to the first disjoint set or the second disjoint set by skipping or not skipping the output data elements in the first and second disjoint sets;
    (b) parallel calculating each separated data in common;
    (c) storing the calculating results; and
    (d) selecting and outputting the stored data corresponding to each separated data.

6. The digital signal processing method as set forth in claim 5,
    wherein input data is picture data,
    wherein step (a) has the steps of:
        determining whether to input data of each separated data or skip data of each separated data at a predetermined interval;
        extracting adjacent pixel data of an object pixel at the center position of an interpolating calculation; and
        selecting input data corresponding to separated data in which the object pixel is contained.

7. The digital signal processing method as set forth in claim 6,
    wherein step (d) has the steps of:
        determining whether or not to output calculated result data of each separated data; and
        selecting output data corresponding to separated data in which the calculated result data is contained.

* * * * *